US005099274A

United States Patent [19]

Mirlieb et al.

[11] Patent Number: 5,099,274

[45] Date of Patent: Mar. 24, 1992

[54] DEVICE FOR TRANSPORTING FILM SHEETS

[75] Inventors: Bernd Mirlieb, Fellbach; Günter Weber, Ostfildern, both of Fed. Rep. of Germany

[73] Assignee: Eastman Kodak Company, Rochester, N.Y.

[21] Appl. No.: 646,601

[22] PCT Filed: Aug. 22, 1988

[86] PCT No.: PCT/EP88/00750

§ 371 Date: Jan. 28, 1991

§ 102(e) Date: Jan. 28, 1991

[87] PCT Pub. No.: WO90/02362

PCT Pub. Date: Mar. 8, 1990

[51] Int. Cl.$^5$ .............................................. G03B 27/52

[52] U.S. Cl. ...................................................... 355/27

[58] Field of Search ................. 355/27, 28, 100, 10 L; 354/312, 319

[56] References Cited

U.S. PATENT DOCUMENTS 4,582,448 4/1986 Costello et al. ..................... 403/324

4,734,743 3/1988 Gregory ............................... 355/27

FOREIGN PATENT DOCUMENTS 3718131 12/1988 Fed. Rep. of Germany .

2582115 11/1986 France .

*Primary Examiner*—L. T. Hix

*Assistant Examiner*—D. Rutledge

*Attorney, Agent, or Firm*—G. Herman Childress

[57] ABSTRACT

Apparatus for transporting photographic sheet material from one unit to another, such as from an X-ray film cassette unloading unit to a processing unit, comprising a housing located between and locked to said units in a novel manner, the housing containing a film transfer device attachable to a wall of the housing adjacent the unloading unit to receive film through an entry opening, and readily positionable to transfer film to either of two exit openings in an opposing wall of the housing to accommodate processing units of different types having entry openings located at different elevations, the locking device also cooperating in the positioning of the transfer device.

19 Claims, 3 Drawing Sheets

DEVICE FOR TRANSPORTING FILM SHEETS

DESCRIPTION

Figure 1:
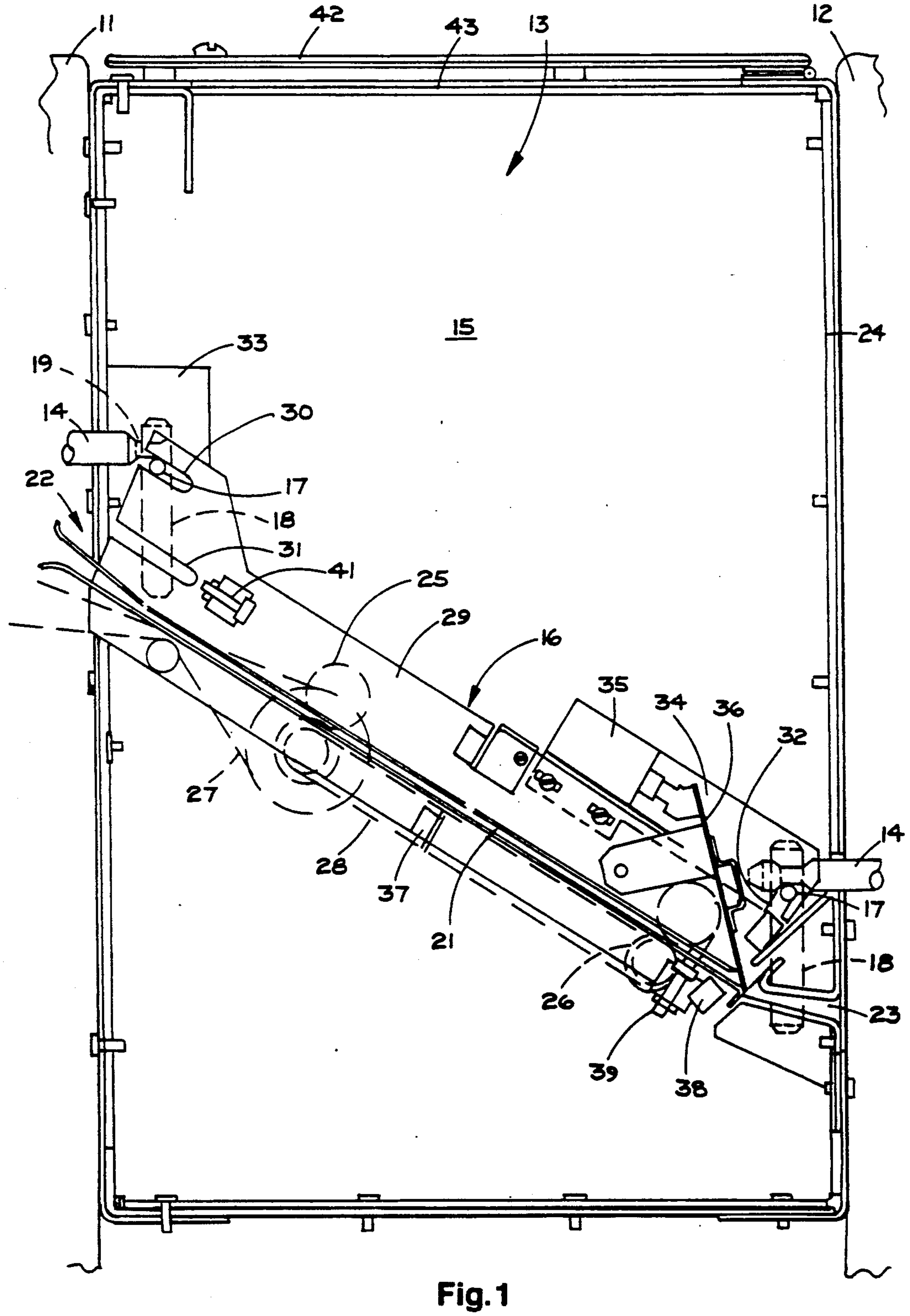

The invention relates to a device for transporting film sheets and sheets of photographic paper, in particular X-ray film sheets, from a cassette loading and unloading unit to a processing unit.

Devices are known which allow X-ray film cassettes to be loaded with X-ray film sheets and also to be unloaded in daylight, i.e. outside a darkroom. The unloaded, exposed X-ray film sheets are then immediately fed from the loading and unloading unit to a film processing unit where they are processed in a chemical processing bath and a fixing bath to produce an X-ray film image which is stable in daylight.

The operating speed of a film processing unit, however, is substantially slower than the unloading speed of a loading and unloading unit. This is why a device is provided between the two units, which adjusts the different speeds to each other. Such a device may consist of a guide path which is arranged between the exit of the one unit and the entrance of the other unit and comprises one or several pairs of rollers for slowing down the speed of a passing X-ray film sheet.

There are, however, different types of processing machines for various purposes which differ from each other both by their outer dimensions and by the construction of their film-guiding elements. This results in that the entrance openings for the X-ray film sheets in different processing units, are arranged at different heights, i.e. at varying distances from the bottom.

It is the object of the invention to provide between a cassette loading and unloading unit for X-ray film sheets and a processing unit a device for slowing down the speed of the passing X-ray film sheets such that said device is on the one hand exchangeable by only a couple of simple manual operations and that it is on the other hand of simple construction and applicable to all types of processing machines having entrance openings arranged at varying heights.

In accordance with the invention this object is attained in that a housing is held and lockable between the loading and unloading unit and the processing unit, in that said housing comprises one or several entrance openings and one or several exit openings for the passage of film sheets and in that within the housing, a single transport table is selectively insertable and held between any of the entrance and exit openings.

In detail the invention provides that locking means which can be manually operated from outside are arranged on the housing and that holding means are disposed on the loading and unloading unit as well as on the processing unit and cooperate with said locking means. The holding means consists of a pin whose end, which extends into the housing, comprises an annular groove, whilst the locking means consists of a rotary shaft mounted in the housing and having a recess in the area of the annular groove such that when the locking means is in its locking position the shaft is brought into locking engagement with the annular groove and when the locking means is in its unlocking position the recess is positioned in the path of movement of the pin. The rotary shaft is provided with a grip portion at its end projecting out of the device.

In this manner the device can be easily and speedily attached and removed if a processing unit or a cassette loading and unloading unit is exchanged or if repairs become necessary.

In order to adapt the position of the transport table to various heights of entrance openings of processing units, the rotary shafts are designed so as to extend across the total width of the housing and are arranged in the housing such that they are associated with the entrance and exit openings in the housing. Moreover, vertically upright wall portions are provided on either end of the transport table, which include guide slits communicating with the exterior and enclosing at least one of the shafts in any of the operating positions of the transport table. At one end of the transport table, the guide slits are provided in mounting plates which are arranged on the transport table so as to be adjustable and arrestable.

Owing to this simple arrangement the transport table can be moved easily and reliably to that position within the housing which is necessary for the loading and unloading unit and the processing unit used.

Further features and advantages can be inferred from the description of an embodiment of the invention illustrated in the drawings as well as from the subclaims.

The drawing shows in

Figure 2:
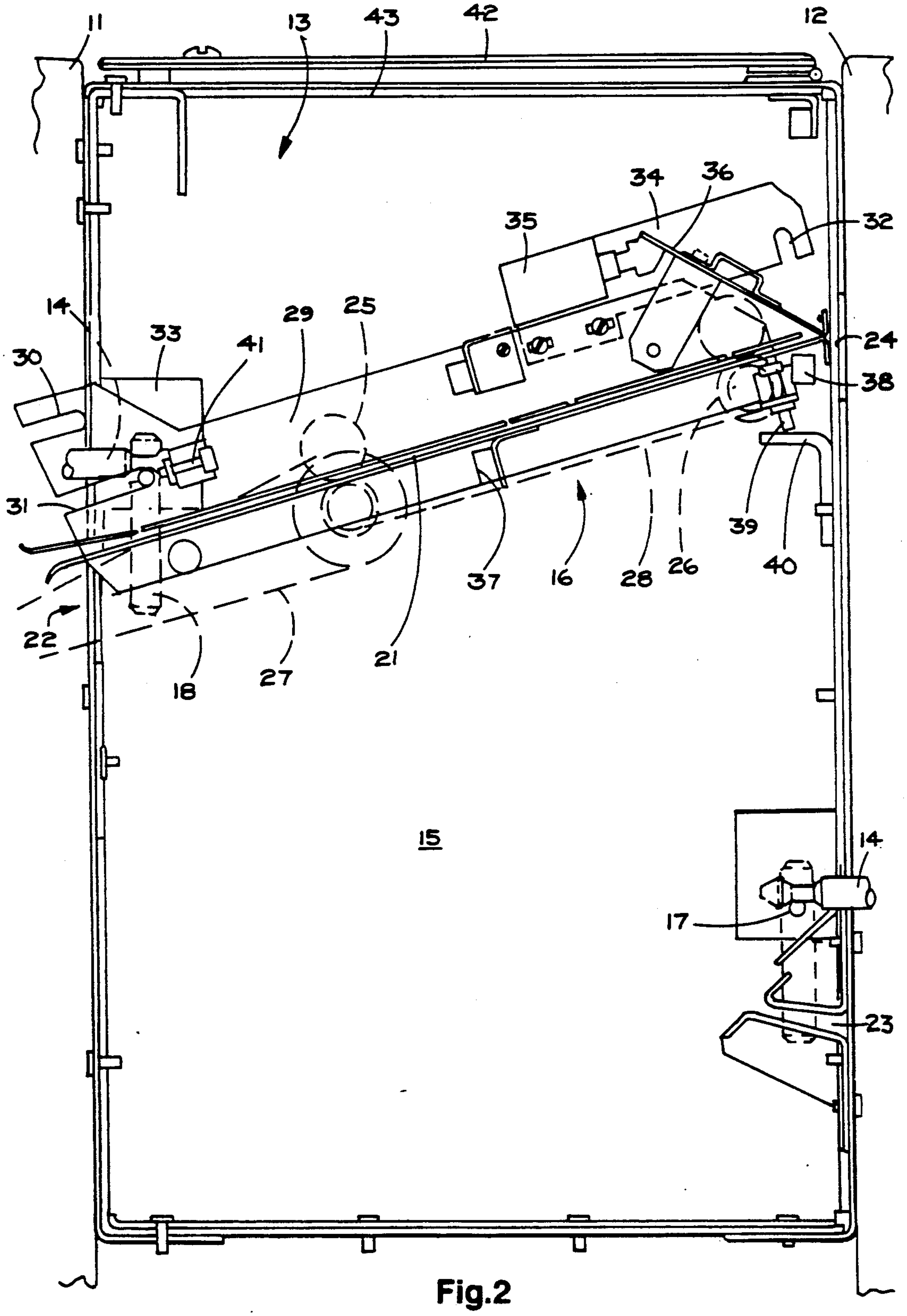
Figure 3:
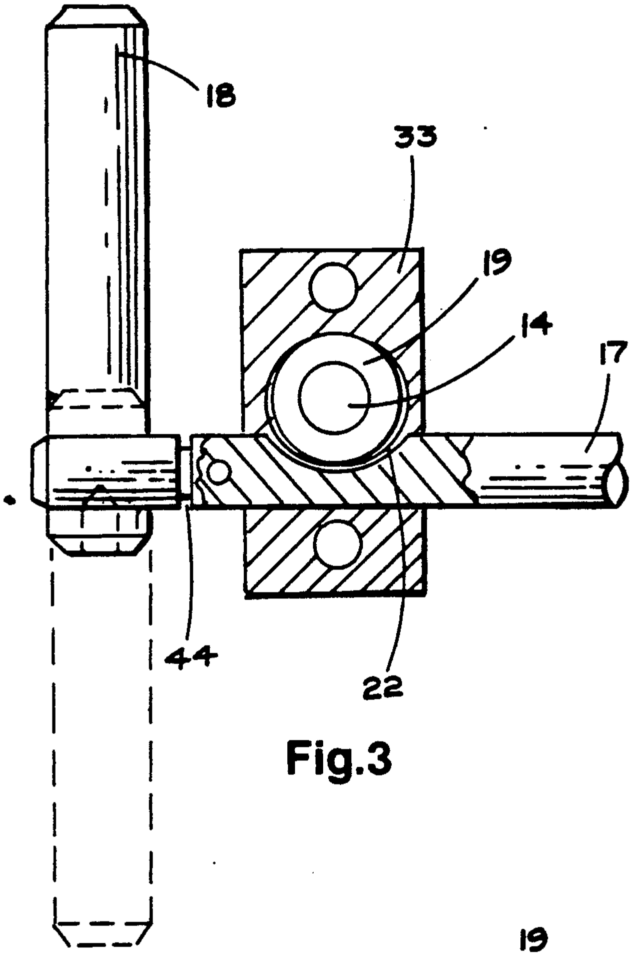
Figure 4:
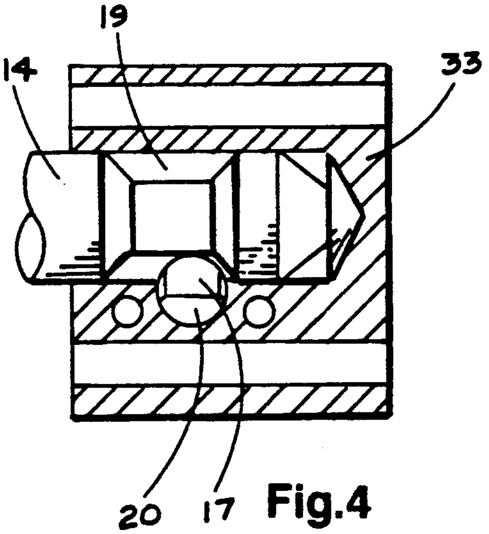
Figure 5:
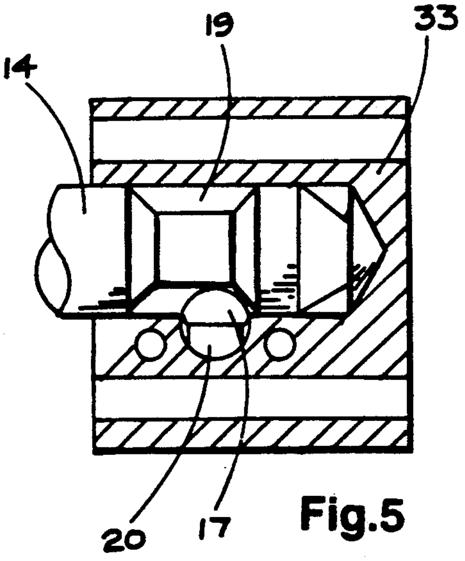

FIG. 1 a sectional view of the device according to the invention with the transport table in a first position, FIG. 2 a sectional view of the device according to FIG. 1 with the transport table in a second position, FIG. 3 an enlarged view of the holding and locking means for the device according to FIG. 1, FIG. 4 an enlarged sectional view of the holding and locking means according to FIG. 3 in the unlocked position, and FIG. 5 an enlarged sectional view of the holding and locking means according to FIG. 3 in the locked position.

As shown in FIG. 1, a device 13 is arranged between sheet material handling units comprising a loading and unloading unit 11 for X-ray sheet-film cassettes and a processing unit 12 for X-ray film sheets, said device consisting substantially of a walled housing 15 and a transport table 16 held in said housing unit.

In order that the device 13 can be readily and easily secured in position, holding means in the form of pins 14 are arranged on the units 11 and 12 and extend with their free ends into the interior of housing 15 to cooperate with locking means which substantially consist of a shaft 17 rotatably mounted in a mounting block 33 and having a grip portion 18 at each of its ends that project out of housing 15, so that grip portions 18 are located outside housing 15.

FIGS. 3, 4 and 5 illustrate that pin 14 is provided at its free end with an annular groove 19 which receives the shaft 17. The shaft 17 has a indentation or recess 20 in the form of a flattened portion in the area of pin 14. In the opening position, into which the shaft is brought by means of grip portion 18, the recess 20 faces the pin. Since the recess is flattened by a length greater than the diameter of pin 14, pin 14 and shaft 17 can be moved apart. The device 13 can be removed from the units 11 and 12.

When the grip portion 18 and thus the shaft 17 is rotated by an angle of 180 degrees, the recess 20 is moved into a position facing away from pin 18 so that the shaft 17 engages the annular groove 19, and the housing 15 of the device 13 is firmly clamped and locked with the units 11 and 12.

The transport table 16 is arranged and exchangeably held within housing 15 and extends with a guide path 21 from the entrance opening 22 provided between the loading and unloading unit 11 and the device 13 to one of the exit openings 23 and 24 respectively provided between the device 13 and the processing unit 12. In the guide path 21, driven pairs of rollers 25 and 26 are arranged which provide for the delayed passage of an X-ray film sheet from the loading and unloading unit 11 to the processing unit 12. For this purpose a belt drive 27 coupled with the drive means in the loading and unloading unit 11 is connected with the pair of rollers 25, and said pair of rollers is connected with the pair of rollers 26 by means of a further driving belt 28.

In order to mount the transport table 16 in housing 15, said housing comprises vertically upright lateral wall portions 29 having in one of their ends guide slits 30 and 31 communicating with the exterior and extending in the longitudinal direction of the transport table. At the opposite end of wall portion 29 another guide slit 32 is provided which, however, extends vertically to the extension of the guide slits 30 and 31. This vertical arrangement of guide slit 32 serves the purpose of preventing the transport table 16 from being shifted in the longitudinal direction if tensional forces are exerted on that table by the belt drive 27.

In the area of the guide slits 30, 31 and 32 provided in the wall portions 29, entering grooves 44 are provided in each shaft 17, said grooves enganging and guiding the wall portions 29 with their guide slits 30, 31 and 32. As can be seen from FIG. 1, the guide slit 30 encloses shaft 17 in a first position of transport table 16 whilst guide slit 32 encloses the opposite shaft 17 and supports the whole transport table 16. In order to be able to compensate for tolerances in connection with the exact alignment of guide path 21 with exit opening 23, the vertical guide slit 32 is in this embodiment provided in an adjustable and arrestable mounting plate 34.

In order to seal the interior of housing 15 and also the interior of the loading and unloading unit 11 against the entrance of any chemical gases and vapors emanating from the processing unit 12, a hinged cover 36 is pivotably mounted on transport table 16, said cover being controlled by a magnet 35 and closing the exit opening 23 if there is no X-ray film sheet transported across transport table 16. The magnet 35 receives its opening and closing pulses from optical sensors 37 and 38 which sense the front edge and rear edge of a passing X-ray film sheet and generate corresponding signals. In the case of the second position of transport table 16 which is illustrated in FIG. 2, the guide path 21 extends from the entrance opening 22 to the upwardly positioned exit opening 24 because a different type of processing unit 12 is connected. In this case the guide slit 31 encloses shaft 17 so that the guide path 21 is correctly aligned with respect to the path of movement of an X-ray film sheet leaving the loading and unloading unit 11. On the other hand, an adjusting screw 39 is supported by a projection 40 of the housing. Adjusting screw 39 allows both the position of the guide path 21 and the position of the hinged cover 36 to be optimally adjusted in height for alignment with exit opening 24. The transport table 16 is aligned in its longitudinal direction by means of a further adjusting screw 41 which is mounted on wall portion 29 and supported by shaft 17.

The adjusting screw 39 supported by projection 40 can be dimensioned such that the alignment of transport table 16 with respect to a further exit opening arranged adjacent to exit opening 24 can be carried out by resetting of the adjusting screw 39. This allows the guide path 21 to be positioned in a simple manner and by means of a single transport table 16 in any of the various positions required between the entrance and exit openings.

A pivotable cover 42 closes an access opening 43 provided on the upper side of housing 15.

We claim:

1. Apparatus for transporting photographic sheet material from a first material handling unit to a second material handling unit, comprising:

walled housing means positionable between said units, said housing means having at least one sheet material entry opening means in one wall and a plurality of sheet material exit opening means in an opposite wall, said exit opening means being located at different elevations so as to cooperate with entry opening means of different second units, means for locking said housing means to said units, a sheet transfer device within said housing means, and means for mounting said transfer device to feed sheet material from said entry opening means to any of said exit opening means.

2. Apparatus according to claim 1, further comprising means located outside said housing means to operate said locking means.

3. Apparatus according to claim 1, wherein said locking means comprises:

pin means having an annularly grooved section mounted on at least one of said units and extending into said housing means, and rotatable shaft means in said housing means and extending transversely of said pin means for cooperation with said annularly grooved section, said shaft means having an indentation positioned to cooperate with said grooved section to hold said pin means and shaft together when said indentation faces away from said pin means, and to release said pin means when said indentation faces said pin means.

4. Apparatus according to claim 3, further comprising:

means located outside said housing means for operating said rotatable shaft means.

5. Apparatus according to claim 4, said shaft means extending across the total width of said housing means, said operating means comprising handles at each end of said shaft means.

6. Apparatus according to claim 1, said mounting means comprising:

mutually engaging elements (a) forming part of said sheet material transfer device, and (b) forming part of said locking means.

7. Apparatus according to claim 1, wherein:

said locking means comprises shaft means adjacent said opening means, said shaft means being carried by said housing means and extending transversely of the direction of sheet material movement, and said transfer device having upright side walls having guide slit means communicating with edges of said side walls and cooperating with said shaft means to position at least one end of said transfer device.

8. Apparatus according to claim 7, said shaft means having groove means, said cooperation comprising engagement of said slit means with said groove means.

9. Apparatus according to claim 7, said guide slit means being located at each end of said transfer device, first said slit means at the sheet material entry end of said transfer device extending longitudinally of said transfer device, and second said slit means at the exit end of the transfer device extending transversely of said first slit means.

10. Apparatus according to claim 9, there being two slits in each said side wall at the sheet material entry end, said slits being of different lengths, one pair of like slits engaging said shaft means in one orientation of said transfer device, and the other pair of like slits engaging said shaft means in another orientation of said transfer device.

11. Apparatus according to claim 9, the shorter pair of said slits engaging said shaft means when said transfer device is mounted to feed sheet material to sheet material exit opening means located at a lower elevation than said sheet material entry opening means, and the longer pair of said slits engaging said shaft means when said transfer device is mounted to feed sheet material to sheet material exit opening means located at a higher elevation than said sheet material entry opening means.

12. Apparatus according to claim 11, wherein said housing means has projection means adjacent said exit opening means for engagement by the exit end of said transfer device, and adjustable means carried by said transfer device for engaging said projection means when said transfer device is mounted to feed sheet material to sheet material exit opening means located at a higher elevation than said entry opening means.

13. Apparatus according to claim 7, said side walls comprising main portions and end portions adjustably attached to said main portions, said second slit means being in said end portions.

14. Apparatus according to claim 1, said mounting means including adjusting screws on said sheet transfer device to provide longitudinal and elevational position adjustment of said transfer device.

15. Apparatus according to claim 1, said transfer device having hinged closure means adjacent its processing unit end for closing off the adjacent sheet exit opening means when no sheet is being transported.

16. Apparatus according to claim 15, further comprising:

magnet means for controlling said closure means, and control means for said magnet means, comprising optical means on said transport device for sensing sheet material presence.

17. Apparatus for transporting photographic sheet material from a cassette unloading unit to a processing unit, comprising:

walled housing means positionable between said units, said housing means having a sheet material entry opening in one wall and sheet material exit openings in an opposite wall at locations higher and lower than said entry opening;

means for locking said housing means to said units, comprising (a)pin means having an annularly grooved section mounted on said units and extending through said respective opposing walls into said housing means, said pin means having an annularly grooved section, (b)rotatable shaft means in said housing and extending across the entire width thereof transversely of said pin means in position to cooperate with said annularly grooved sections, said shaft means having an indentation positioned to cooperate with said grooved section to hold said pin means and shaft means together when said indentation faces away from said pin means, and to release said pin means when said indentation faces said pin means, and (c)handle means on at least one end of said shaft means outside said housing means, for rotating said shaft means;

a sheet transfer device within said housing, comprising, spaced side walls having at each end guide slit means for engaging said rotatable shaft means, said shaft means having grooves for receiving said slit means, there being two spaced slit means of unequal length similarly positioned on each of said side walls at the entry end of said transfer means and opening toward said cassette unloading unit, the longer of said slit means engaging said shaft means when said transfer device is mounted to feed sheet material to an exit opening at a higher location than said entry opening, the shorter of said slit means engaging said shaft means when said transfer device is mounted to feed sheet material to an exit opening located at an elevation lower than said entry opening, and said slit means at the exit end of said transfer device opening downwardly transversely of said first mentioned slit means to engage said shaft means adjacent a lower exit opening;

support means attached to said housing wall adjacent the upper of said exit openings; and adjustment screw means carried by said transfer device to engage said support means.

18. Apparatus according to claim 17, said transfer device having hinged closure means adjacent said processing unit for closing off the adjacent exit opening when no sheet is being transported.

19. Apparatus according to claim 18, further comprising:

magnet means for controlling said closure means, and control means for said magnet means, comprising optical means on said transport device for sensing sheet material presence.

* * * * *